3,356,626
MANUFACTURE OF FILMS OF N-SUBSTITUTED ACRYLAMIDE COPOLYMERS
Frank Reeder, Coventry, England, assignor to Courtaulds Limited, London, England, a British company
No Drawing. Filed Feb. 13, 1964, Ser. No. 344,535
Claims priority, application Great Britain, Feb. 15, 1963, 6,181/63
4 Claims. (Cl. 260—29.6)

This invention relates to copolymers soluble in certain aqueous solutions and insoluble in water.

A linear addition copolymer which is insoluble in water and soluble in an aqueous solution containing 25 percent by weight of $CaCl_2$ at 25° C. to the extent of at least 5 percent by weight, comprises at least 35 mole percent of units of an N-substituted amide having the formula

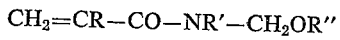

$$CH_2=CR-CO-NR'-CH_2OR''$$

in which R is hydrogen or alkyl, R' is hydrogen, methyl or hydroxyethyl and R'' is hydrogen or methyl, the balance of the copolymer being units of at least one other ethylenically unsaturated compound.

The N-substituted amide content of a binary copolymer may vary within a characteristic, continuous range extending from a minimum content which is sufficient only to endow the copolymer with solubility in the calcium chloride solution, to a maximum which is short of that content which would result in the copolymer being water-soluble. The extent of the range and the magnitude of the contents embraced by that range vary with the chemical composition of the units embodied in the copolymer.

In a ternary or more complex copolymer there is also a range of N-substituted amide contents which can produce the required solubility characteristics, but this range varies not only with the chemical nature of the units, but also with respect to the relative proportions of the units of specified comonomers.

The preferred N-substituted amides are derivatives of acrylamide, methacrylamide, itaconamide and monoitaconamide.

The preferred ethylenically unsaturated compounds are derivatives of acrylic acid and methacrylic acid, including acrylonitrile and methacrylonitrile, and esters of both acids, particularly those derived from alcohols containing up to 4 carbon atoms, for example ethyl acrylate and methyl methacrylate. Styrene, vinyl esters and other vinyl compounds reactive in copolymerisation with the N-substituted amides may also be used.

The copolymer may be made by any of the known addition polymerisation techniques employing free radical initiators, which avoids acidic conditions below about pH 4 and prolonged high temperatures i.e. above about 100° C. I prefer to polymerise the mixture of N-substituted amide and one or more ethylenically unsaturated compounds with azo catalysts and particularly water soluble thermolabile azo catalysts, for example azo-bis-γ-cyanovaleric acid, at temperatures within the range 50° to 80° C.

The copolymerisation may be carried out with the mixture dispersed in water or in certain salt solutions. The copolymer precipitates from the water-borne reaction as it is formed, but in the salt solutions the copolymer remains in solution and the solution thickens as the reaction proceeds. In this way it is possible to derive a solution which can be used directly in making filaments and films of the copolymer by extrusion into a coagulant, for example water.

The shaped bodies of the copolymer may be rendered less soluble by heat, particularly in the presence of an acidic catalyst. The copolymer loses some at least of the methylol or etherified methylol groups, $CH_2OR''$ under these conditions, either by giving off formaldehyde or as a result of a reaction in which the group $CH_2OR''$ forms methylene bridges, cross-linking the polymer.

Other coagulant systems participate in the chemical modification of the polymer. For example when the copolymer solution in aqueous calcium chloride is brought into contact with sodium silicate, the copolymer is coagulated and then contains some silicate. When the coagulated mass is heated, the product is harder than the corresponding simple cured copolymer and embodies chemically bound silicate.

Whilst 25 percent calcium chloride solution has been chosen as the solvent for defining the characteristics of the copolymer it will be understood that other more concentrated or more dilute solutions of the salt can be used in practice to form copolymer solutions for producing shaped bodies of the copolymer, and, indeed, that aqueous solutions of other salts, for example the halides and thiocyanates of metals of Group I or II or the Periodic Table, or simple organic liquids can be used for the same purpose. However, calcium chloride solutions are the preferred solvents as the salt has the specific advantage of forming a complex with N-methylol amide groups, which is more soluble than the simple group in aqueous media. The complex is the product of an equilibrium reaction and requires an excess of salt to enable it to form to a pronounced extent. For this reason I prefer aqueous solutions containing from 10 percent to 50 percent by weight of the calcium chloride as solvents.

The copolymers of a N-substituted amide and acrylonitrile are particularly valuable fibre-forming materials. The N-substituted amide content of these copolymers may vary between about 35 mole percent and 50 mole percent. Copolymers containing near-minimum amounts of the amide are the most readily coagulated and have been employed in a spinning process using a coagulating bath consisting of water.

The copolymers can be elastic when a comonomer, which in the form of its simple homopolymer has little or no tendency to crystallise, is copolymerised with the N-substituted amide and the resulting copolymer is cured by forming methylene cross-links therein. The process has the advantages that the uncured copolymer is soluble, can be shaped by extruding a solution into a coagulant, and the curing process can then be carried out on the shaped body. Elastic filaments and films may be made in this way.

The invention is illustrated by the following examples:

EXAMPLE 1

*Preparation of methylolacrylamide solution*

A solution of 225 grams of acrylamide in 300 ml. of water was adjusted to pH 9 with caustic soda. A second solution containing 36 percent w./v. of formaldehyde was also adjusted to pH 9 with caustic soda. The solutions were mixed and the pH tested and readjusted to pH 9 where necessary. The mixture was allowed to stand for 48 hours at room temperature so that the final solution (Solution A) theoretically contained 36.5 percent w./v. methylolacrylamide.

*Preparation of copolymer*

A polymerisation charge was made up as follows:

57 grams of acrylonitrile (60 mole percent)
194 mls. of Solution A (40 mole percent)
0.324 gram of sodium persulphate.

The charge was mixed and homogenised and adjusted to pH 8 with caustic soda. The charge was added at a uniform rate over 42 minutes to 638 grams of a 25 percent w./w. calcium chloride solution adjusted to pH 8, contained in the 700 ml. flask equipped with stirrer and reflux container and supported in a bath containing water at 80° C., to produce a rather cloudy homogeneous dope which became viscous on cooling. The dope was coagulated by water to give films and filaments which were elastomeric when wet.

Filaments which had been stretched whilst wet and dried under tension, retracted on rewetting. The filaments could be put through this cycle many times. If, however, the filaments were impregnated with a catalyst such as magnesium chloride or a phosphate buffer at pH 2.4 and then dried and heated, the filaments become stable and had no elastomeric properties on wetting. The cross-linked filaments and films resisted the action of boiling water and it was found possible to mould the wet elastomeric films or fibres impregnated with a catalyst, to dry and cure, and to obtain a non-elastomeric, shaped body.

EXAMPLE 2

*Preparation of copolymer*

The procedure followed in Example 1 was used again but the polymerisation charge was made up as follows:

52.4 grams of acrylonitrile (65 mole percent)
145.5 ml. of Solution A (35 mole percent)
0.27 gram of ammonium persulphate.

The charge was added to 695 grams 25 percent w./w. calcium chloride solution.

Again a viscous solution was obtained more cloudy than that from Example 1. The conversion of monomer to polymer was 72 percent complete, the polymer had an intrinsic viscosity of 2.05 and, again, the dope was coagulated in water to produce rubbery films and filaments. Impregnating the films with the catalyst, followed by heating, gave tough water-resistant films. Filaments which had been extruded into water and dried under tension without cure contracted by 60 percent on wetting out.

In a similar polymerisation in which the mole percent of acrylonitrile was 70, granular polymer separated from the solution during polymerisation.

EXAMPLE 3

*Preparation of copolymer*

A solution of the copolymer was prepared as in Example 2 but the catalyst content of the polymerisation charge had been increased to 0.54 gram of ammonium persulphate. Films of the copolymer were cast in sodium silicate solution (9 percent w./w. $Na_2O$, 18 percent w./w. $SiO_2$) rinsed in water and then impregnated with dilute phosphoric acid, followed by drying and baking for 1 hour at 130° C. Films of very high surface hardness were obtained.

Films of lower calcium content were made by casting, films from the calcium chloride solution of the copolymer into water, removing them after a short period, say 30 seconds, and then transferring the film to a waterglass solution as above. Films of high surface hardness were again obtained.

EXAMPLE 4

123 parts of acrylonitrile, 177 parts of N-methoxymethylacrylamide and 3 parts of azo-bis-γ-cyanovaleric acid were made up to 2500 parts with an aqueous 25 percent w./w. $CaCl_2$ solution. The pH was adjusted to 8 and the mixture heated at 75° C. for two hours by which time a homogeneous viscous solution had resulted. The polymer was precipitated in the form of a film by coagulating a layer of the solution with methanol. The methanol contained 1 percent of phosphoric acid, some of which was retained by the coagulated film. The film was cured on heating to 150° C. for 8 minutes.

What I claim is:

1. A process for the manufacture of a film or filament of a linear addition copolymer which is insoluble in water and soluble in an aqueous solution containing 25% of $CaCl_2$ at 25° C. to the extent of at least 5 percent by weight, comprising
    (a) stirring a mixture of
        (i) an N-substituted amide having the formula $CH_2=CR-CO-NR'-CH_2OR''$ in which R is hydrogen or alkyl, R' is hydrogen, methyl or hydroxyethyl and R'' is hydrogen or methyl,
        (ii) at least one other mono-ethylenically unsaturated compound capable of being copolymerized with the N-substituted amide,
        (iii) a water-soluble free radical initiator, and
        (iv) an aqueous salt solution containing at least 10% of a halide of a metal chosen from Groups I and II of the periodic Table,
    (b) thereby to form a water insoluble copolymer containing at least 35 mol percent of units of the N-substituted amide, in solution, in the salt solution,
    (c) forming a thin layer or stream of the solution, and
    (d) coagulating the thin layer or stream.

2. A process as claimed in claim 1 comprising heating the film or filament of the copolymer in the presence of an acidic catalyst whereby the copolymer is cross-linked.

3. A process as claimed in claim 1 in which the water-soluble initiator is a thermolabile azo compound.

4. A process as claimed in claim 1 wherein the copolymer comprises acrylonitrile units with from 35 to 50 mole percent of units of N-substituted amide.

References Cited

UNITED STATES PATENTS

| | | | |
|---|---|---|---|
| 3,056,170 | 10/1962 | Hendricks et al. | 260—29.6 |
| 2,718,515 | 9/1955 | Thomas | 260—89.1 |
| 2,680,110 | 6/1954 | Loughran et al | 260—29.6 |
| 2,761,856 | 9/1956 | Suen et al. | 260—80.3 |
| 2,923,694 | 2/1960 | Schmidt | 260—29.6 |
| 3,056,757 | 10/1962 | Rakowitz | 260—29.6 |
| 3,033,811 | 5/1962 | Brown et al. | 260—29.4 |

FOREIGN PATENTS

| | | |
|---|---|---|
| 668,765 | 8/1963 | Canada. |
| 610,432 | 12/1960 | Canada. |

GEORGE F. LESMES, *Primary Examiner.*

MURRAY TILLMAN, *Examiner.*

W. J. BRIGGS, Sr., *Assistant Examiner.*